July 27, 1926.
E. O. YOUNG
TIRE REPAIR TOOL
Filed March 5, 1926
1,594,031
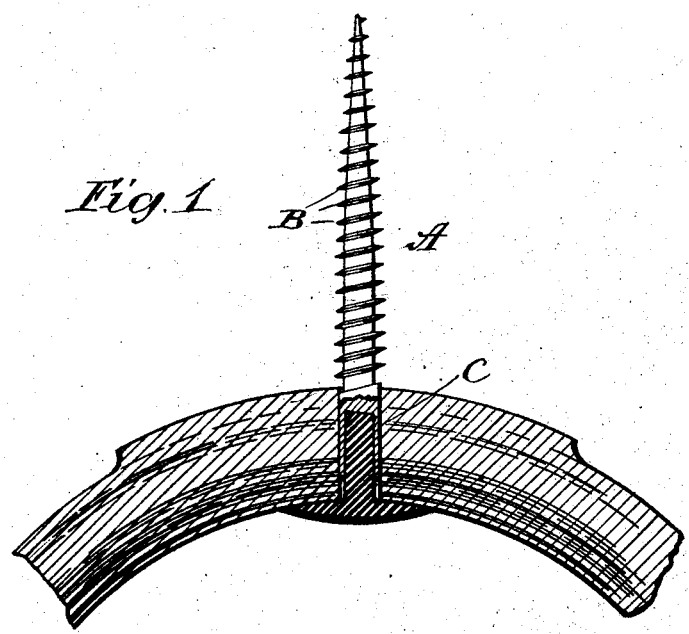
Fig.1
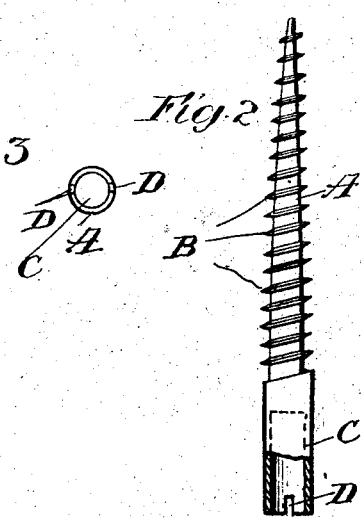
Fig.3  Fig.2
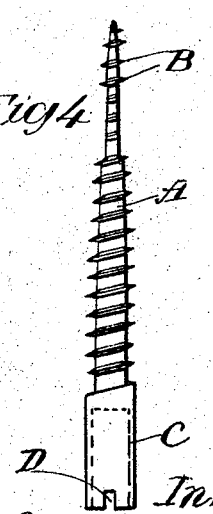
Fig.4
Inventor
Edward O. Young
by Wm H. Monroe Attorney Patented July 27, 1926.

1,594,031

UNITED STATES PATENT OFFICE.

EDWARD O. YOUNG, OF CLEVELAND HEIGHTS, OHIO.

TIRE-REPAIR TOOL.

Application filed March 5, 1926. Serial No. 92,510.

The objects of the invention are to provide an improvement in tools for inserting into the opening made in a tire by cutting or puncturing the same, the rubber stem attached to a tire patching plug that is employed to cover the opening. Hitherto a tapered hollow needle has been employed to carry the plug until it has been inserted in this opening, but the difficulty found in forcing such an implement through the several layers of frictioned fabric and rubber has made this tool impracticable to use for this purpose.

To provide a tool that is easily inserted in the punctured opening and that will quickly cut its way through the thick substance of the tire and is also cheaply and quickly made, I employ an elongated screw which may be tapered toward its inner end, and is provided with a hollow cylindrical outer extremity in which the stem of the plug is inserted. Also provision is made at its outer end for revolving the same to cause it to enter the tire, and further provision may be made if necessary adjacent to the inner end for revolving the same, when it projects through the tire, for revolving it further to withdraw it from the tire. In this manner a plug having its stem inserted in the opening in the larger end of the tool will be left in the puncture when the tool has been withdrawn therefrom.

In practice the tool is first passed through the tire until its larger end is even with the inner surface of the tire and the recessed inner surface of the plug is then filled with cement or liquid rubber, the stem is inserted in the opening in the end of the tool and the tool is withdrawn, leaving the side walls of the opening in the tire coated with cement or liquid rubber and the stem firmly seated in its place.

The end of the stem of the plug will then project through the tire and somewhat beyond the outer surface thereof and may be then ignited and will burn like a candle until it is even with the outer surface of the tire, thereby vulcanizing its outer end to the surface of the tire and making a waterproof and dust proof joint therewith.

In these views, Fig. 1 is a transverse section of a tire showing the manner of introducing the tool. Fig. 2 is a side elevation of the tool. Fig. 3 is an end view thereof and Fig. 4 illustrates a tool provided with flat sides to be engaged by a pair of nippers adjacent to the smaller end.

In these views, A is the tapered body of the screw having preferably a sharp thin spiral web or thread B thereon. The larger extremity of the screw is cylindrical and has a smooth surface and is provided with a longitudinal bore C, also the edges of the walls of the bore are slotted transversely at D to permit of the use of a screw driver or key to turn the screw when introducing it into the opening in the tire.

If a very large opening is found a larger tool may be employed and if it cannot be withdrawn by hand from the tire after use the sides of the tool may be flattened adjacent to the smaller end thus permitting it to be grasped by means of a pair of nippers and drawn through the opening in the tire.

Having described the invention, what I claim as new and desire to secure by Letters-Patent is:

A tool for inserting a rubber plug in a tire puncture comprising a tapered body, said body having a smooth cylindrical outer extremity, and provided with a thin spiral cutting web or thread extending over its outer surface from said cylindrical extremity to the point thereof, and also provided with a cylindrical bore in its larger end, the extremities of the walls of said bore being transversely slotted substantially as and for the purpose described.

In testimony whereof I hereunto affix my signature this 4th day of March, 1926.

EDWARD O. YOUNG.